(12) United States Patent
Tanaka (10) Patent No.: US 7,751,725 B2
(45) Date of Patent: Jul. 6, 2010

(54) OPTICAL RECEIVER WITH MONITORING UNIT AND A METHOD FOR DETECTING CONSECUTIVE IDENTICAL STATE OF OPTICAL SIGNAL

(75) Inventor: Keiji Tanaka, Yokohama (JP)

(73) Assignee: Sumitomo Electric Industries, Ltd., Osaka-Shi (JP)

( * ) Notice: Subject to any disclaimer, the term of this patent is extended or adjusted under 35 U.S.C. 154(b) by 894 days.

(21) Appl. No.: 11/500,325

(22) Filed: Aug. 8, 2006

(65) Prior Publication Data
US 2007/0036541 A1    Feb. 15, 2007

(30) Foreign Application Priority Data

Aug. 10, 2005  (JP)  ............................... 2005-232231
Aug. 23, 2005  (JP)  ............................... 2005-241329

(51) Int. Cl.
H04B 10/06 (2006.01)
H04B 10/08 (2006.01)

(52) U.S. Cl. ............................ 398/202; 398/208; 398/9; 398/24; 398/38

(58) Field of Classification Search ............... 398/9–38, 398/202, 208; 359/341.44, 344.41
See application file for complete search history.

(56) References Cited

U.S. PATENT DOCUMENTS 5,589,683 A    12/1996    Nakai 6,595,708 B1 *  7/2003  Yamashita .................... 398/202
6,636,348 B2 * 10/2003  Noguchi ................. 359/341.44
6,907,202 B1 *  6/2005  Ide et al. ...................... 398/208

FOREIGN PATENT DOCUMENTS

| | | |
|---|---|---|
| JP | 02-206261 | 8/1990 |
| JP | 04-095426 | 3/1992 |
| JP | 05-063650 | 3/1993 |
| JP | 07-095156 | 4/1995 |
| JP | 08-046571 | * 2/1996 |
| JP | 09-284222 | 10/1997 |
| JP | 2000-092136 | 3/2000 |
| JP | 2003-152460 | 5/2003 |

* cited by examiner

Primary Examiner—Li Liu
(74) Attorney, Agent, or Firm—Venable LLP; Michael A. Sartori; Steven J. Schwarz (57) ABSTRACT

The present invention provides an optical receiver that includes a monitoring unit with a function to prevent the unit from misjudging of the loss-of-signal state. In particular, the present invention is applicable to the monitoring unit that receives the signal to be judged from the processing unit posterior to the optical converting unit that couples with the processing unit via the capacitor. The signal reflects the second or higher order response lag due to the coupling capacitor. The monitoring unit of the invention generates the loss-of-alarm signal when the signal is continuously smaller than the first reference by a preset time and continuously greater than the second reference by the present time.

15 Claims, 9 Drawing Sheets

OPTICAL RECEIVER WITH MONITORING UNIT AND A METHOD FOR DETECTING CONSECUTIVE IDENTICAL STATE OF OPTICAL SIGNAL

BACKGROUND OF THE INVENTION

1. Field of the Invention

The present invention relates to an optical receiver used in an optical communication system to receive an optical signal.

2. Related Prior Arts

Figure 6:
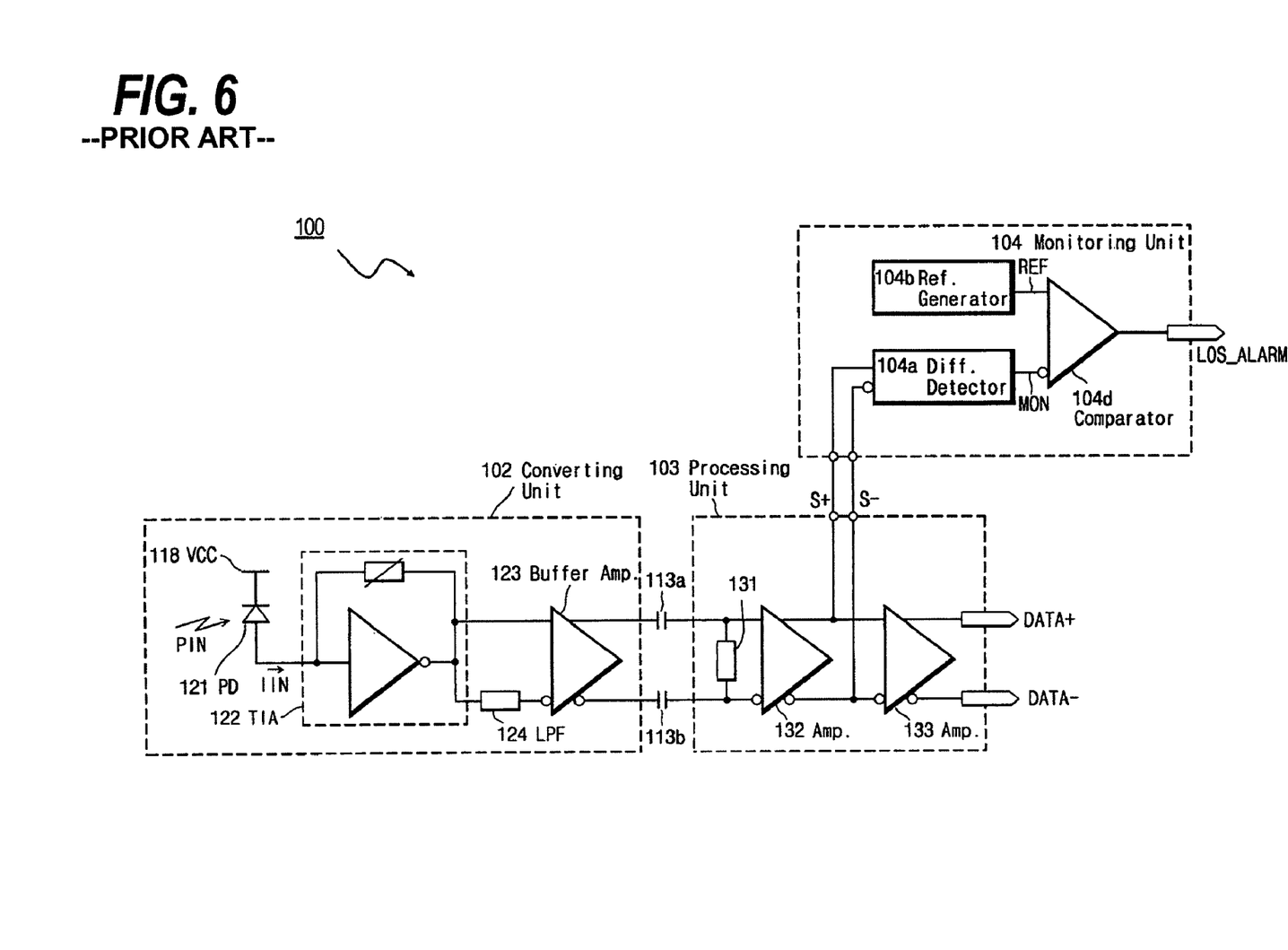
FIG. 6 is a block diagram of the optical receiver that includes the conventional monitoring unit.

FIG. 6 shows an example of a conventional monitoring unit 104 installed within an optical receiver 100. The optical receiver 100 includes a converting unit 102, a processing unit 103, a pair of capacitors, 113a and 113b, to couple the converting unit 102 with the processing unit 103, and a resistor 131 for defining the input impedance of the processing unit 103. The converting unit 102 provides a photodiode (hereinafter denoted as PD) 121 for converting an optical signal PIN into a current signal IIN, a trans-impedance amplifier (hereinafter denoted as TIA) 122 for converting the current signal IIN into a voltage signal, and a buffer amplifier 123 configured to transform the output of the TIA 102 into a differential signal. The processing unit 103 includes a plurality of amplifiers, 132 and 133. The monitoring unit 104 takes the differential signal from the outputs of the first amplifier 132 in the processing unit 103.

The monitoring unit 104 includes a differential detector 104a, a reference generator 104b, and a comparator 104c. The differential detector 104a is configured to hold a peak level in a difference of the input signals and to generate an envelope MON corresponding to the variation of the peak level. Comparing this envelope MON with a reference REF generated in the reference generator 104b, the comparator 104c sets the output thereof when the output MON of the differential detector 104a is smaller than the reference REF, which is LOS_ALARM indicating that the optical signal PIN is lost, namely, Loss-Of-Signal alarm.

Various monitoring units have been well known. For example, the Japanese patent application published as JP-2003-152460A, has disclosed one type of the monitoring unit, in which the photocurrent generated by the PD is monitored through the current mirror circuit and a status of no optical signal is detected by comparing the voltage signal converted from thus detected photocurrent. Moreover, the optical receiver disclosed therein, the monitoring of the optical signal has been carried out from the current anterior to the high pass constituted by the capacitor coupling the converting unit and the processing unit and the resistor.

The other Japanese patent application published as JP-H07-095156A has disclosed another circuit to decide a loss-of-signal alarm. The circuit disclosed therein provides a level detector to generate an alarm to indicate the decrease of the optical input level and a consecutive identical detector to detect a state where the logical "0" level continues more than a predetermined number in the data recovered from the input signal.

The conventional monitoring unit 104 shown in FIG. 6 takes the signal from a position posterior to the coupling capacitor, 113a and 113b, and the resistor 131 to detect the peak level in the difference of the input signals. In such case, the coupling capacitor, 113a and 113b, and the resistor 131 constitute a high pass filter (hereinafter denoted as HPF), and cause a first order lag in the signal output from the converting unit 102. Additionally, when the optical receiver 100 has the TIA 122 with a unit to adjust the conversion gain thereof by varying the feedback resistance, a low-pass filter (hereinafter denoted as LPF) 124 to convert a single-ended output of the TIA 122 into a differential output, and a feed-forward circuit to cancel the input offset voltage of the processing unit 103, these particular circuits cause the second order lag to make the response of the monitoring unit 104 complex when the optical signal is shut down or recovered.

Figure 7A:
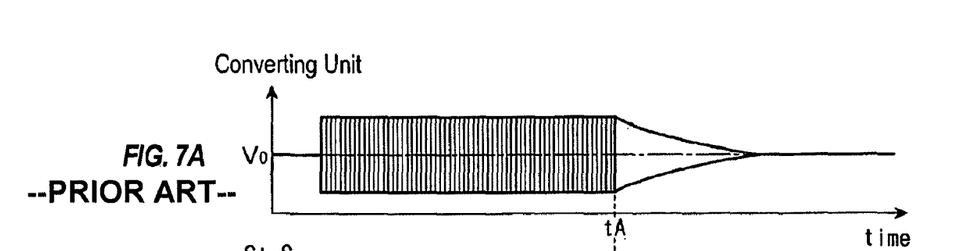
Figure 7B:
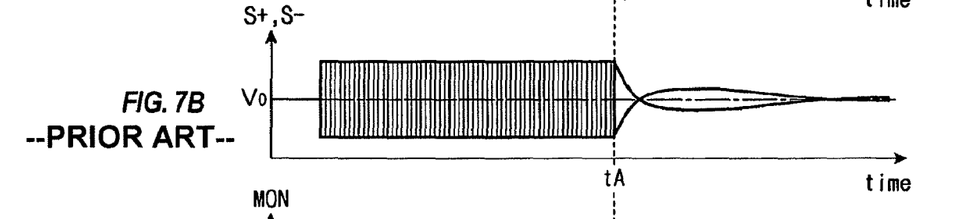
Figure 7C:
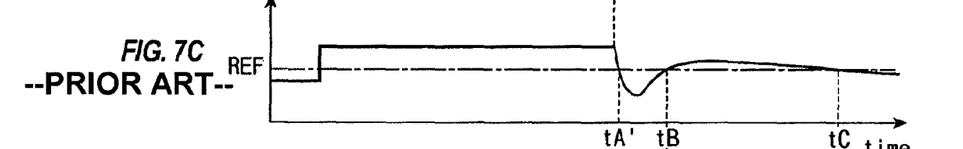
Figure 7D:
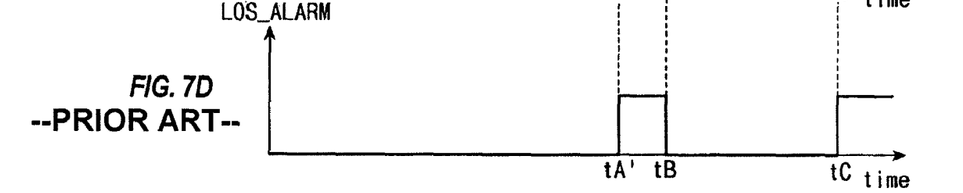

FIGS. 7A to 7D are time-charts of the optical receiving 100 when the optical signal PIN is shut down at tA. FIG. 7A shows an output of the converting unit 102, FIG. 7B shows an output from the HPF formed by the capacitors, 113a and 113b, and resistor 131, FIG. 7C shows an output MON of the differential detector 104a, and FIG. 7D is an output of the comparator 104c, namely, the LOS_ALARM.

The output of the converting unit 102, as mentioned previously, shows the first order lag due the LPF 124 to convert the single ended signal into the differential signal. Accordingly, the waveform of the output of the converting unit 102 after the time tA shows a gradual approach to the center level $V_0$ from the lower and upper levels, as shown in FIG. 7A. The outputs, S+ and S−, from the HPF adds the second order lag, accordingly, the waveform after the time tA behaves as the second order response accompanying with overshoots and undershoots, as shown in FIG. 7B. The influence of the overshoot is left in the output MON from the differential detector 104a, as shown in FIG. 7C. When the overshoot in the output MON of the differential detector 104a exceeds the reference REF, from tB to tC in FIG. 7C, the alarm LOS_ALARM indicating the loss-of-signal may be temporarily reset despite the status with no optical signal continues.

The Japanese patent published as JP-2003-152460A detects the signal prior to the capacitor to avoid the first order lag due to the HPF. However, the circuit disclosed in the patent branches the output of the current-to-voltage converter, which degrades the high frequency performance of the optical receiver.

The present invention is to provide an optical receiver, in which the monitoring unit receives the signal posterior to the HPF, namely, the signal with the second order lag, that prevents the erroneous operation to temporarily reset the alarm indicating the no optical signal.

SUMMARY OF THE INVENTION

According to one feature of the present invention relates to a method for detecting a consecutive identical state in a HIGH level or a LOW level of the optical signal that switches between the HIGH and LOW levels and for generating an alarm signal when the HIGH or LOW levels continues for a predetermined period. The method comprises: (a) converting the optical signal into a corresponding electrical signal; (b) Setting a first comparative output when the electrical signal is in a first state, which corresponds to the HIGH level of the optical signal, and setting a second comparative output when the electrical signal is in a second state, which corresponds to the LOW level of the optical signal; (c) counting a first period by a first counter when the first comparative output is set and counting a second period by a second counter when the second comparative output is set; (d) latching the output of the first counter by a first latch when the first counter counts at least a predetermined number, and latching an output of the second counter by a second latch when the second counter counts at least the predetermined number; and (e) performing the logical sum of the output of the first and second latches to generate the alarm signal.

In the method described above, since the period shorter than the count of the predetermined number may be omitted from generating the alarm signal, a misjudging of the state where the optical signal is shut down or is kept constant may be prevented even when the electrical signal includes a second or higher order delay due to a capacitor and an inductor. The electrical signal in the present invention may be a differential signal including a normal phase signal and an opposite phase signal. Moreover, the decision of the first and second sates may be carried out by comparing the electrical signal with a reference signal, or by comparing the normal phase signal with the opposite phase signal.

Another feature of the present invention relates to an optical receiver that includes a converting unit, a processing unit, and a monitoring unit. The converting unit receives the optical signal and converts this optical signal into a corresponding electrical signal. The processing unit amplifies this electrical signal to output from the optical receiver. The monitoring unit, by receiving an electrical signal from the processing unit, generates an alarm signal by judging whether a state where the peak level of the electrical signal is smaller than a first reference continues for a preset period or another state where the bottom level of the electrical signal is greater than a second reference continues for the preset period.

The preset period may be forwarded by the first counter for the peak level, while by the second counter for the bottom level. These counters may filter a state where the period when the peak level is smaller than the first reference is shorter than the preset period, or another state where the period when the bottom level is greater than the second reference is shorter than the preset period. Therefore, the monitoring unit may generates a true alarm signal even when the electrical signal output from the processing unit includes overshoots and undershoots due to the second or higher order delay.

The electrical signal output from the processing unit may be a differential signal including a normal phase signal and an opposite phase signal, and the monitoring unit may generate the alarm signal by judging whether a HIGH level or a LOW level, which are generated by comparing the normal phase signal with the opposite phase signal, continues for the preset period.

BRIEF DESCRIPTION OF DRAWINGS

FIGS. from 2A to 2G show time charts of the optical signal PIN, the outputs, S+ and S−, of the processing unit, the output 1_HOLD of the peak hold, the output 1_COMPARE of the first comparator, the system clock CLK, the output 1_COUNTER of the first counter, and the output 1_LATCH of the first latch, respectively, when the optical signal PIN is shut down at t2.

FIGS. from 3A to 3G show time charts of the optical signal PIN, the outputs, S+ and S−, of the processing unit, the output 0_HOLD of the bottom hold, the output 0_COMPARE of the second comparator, the system clock CLK, the output 0_COUNTER of the second counter, and the output 0_LATCH of the second latch, respectively, when the optical signal PIN is shut down at t2.

FIGS. from 4A to 4G show time charts of the optical signal PIN, the outputs, S+ and S−, of the processing unit, the output 1_COMPARE of the first comparator, the system clock CLK, the output 1_COUNTER of the first counter, the reset signal CLR, and the output 1_LATCH of the first latch, respectively, when the optical signal PIN recovers from the shut down state at t14.

FIGS. from 5A to 5E show time charts of the optical signal PIN, the outputs, S+ and S−, of the processing unit, the output 0_HOLD of the bottom hold, the output 1_HOLD of the peak hold, and the outputs, 0_COMPARE and 1_COMPARE of each comparator, respectively, when the optical signal becomes stable state with substantially magnitude but without any data.

FIGS. from 7A to 7D show time charts of the output of the converting unit, the outputs, S+ and S−, of the processing unit that passes through the high-pass-filter, the output MON of the peak hold, and the output LOS_ALARM of the comparator, respectively, in the conventional monitoring unit when the optical signal PIN is shut down at tA.

DESCRIPTION OF PREFERRED EMBODIMENTS

Next, preferred embodiments of the present invention will be described as referring to accompanying drawings. In the explanation of the drawings., the same symbols and numerals will refer to the same elements without overlapping explanations.

First Embodiment

Figure 1:
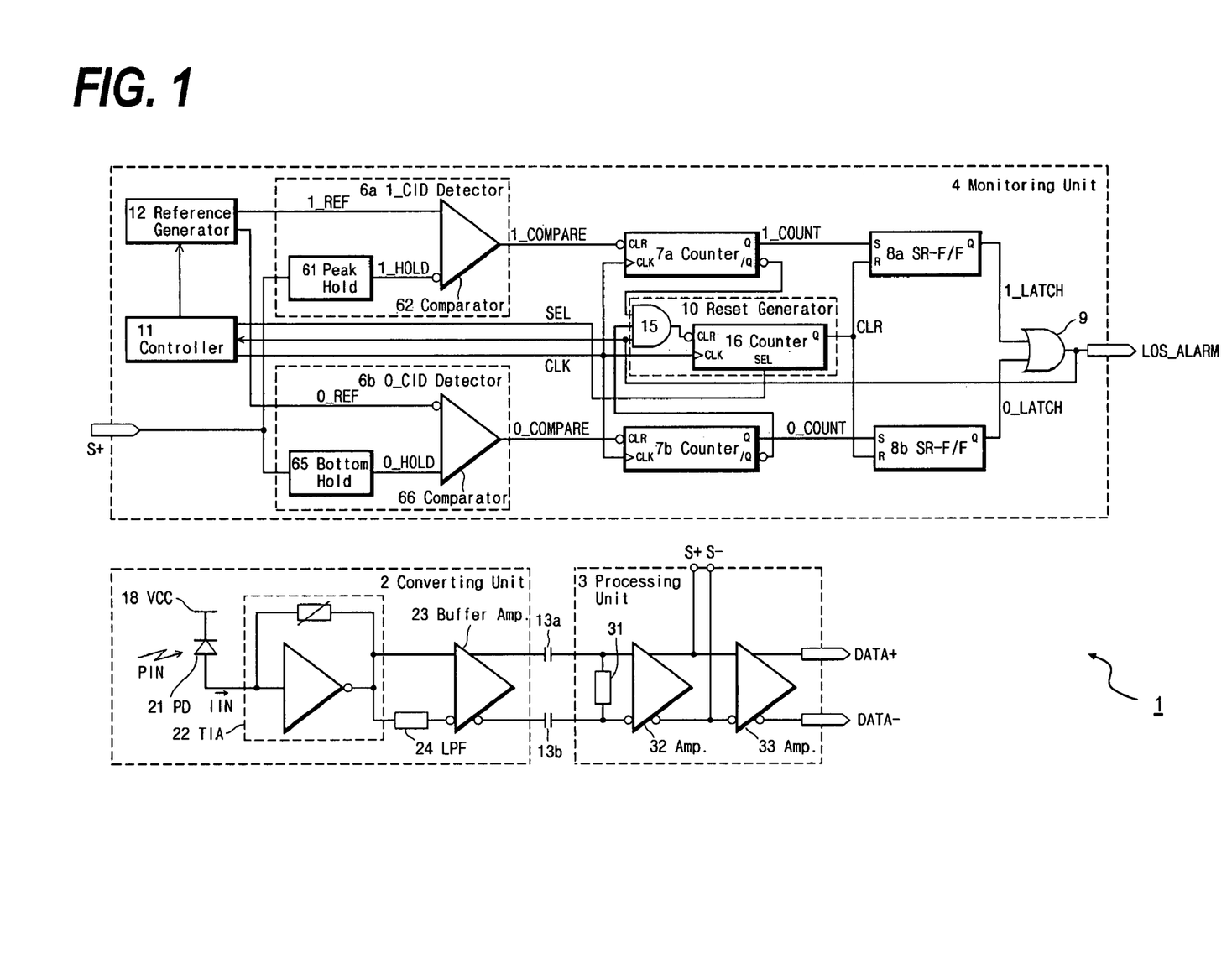
FIG. 1 is a block diagram of the optical receiver according to the first embodiment of the present invention.

FIG. 1 shows an optical receiver according to one embodiment of the present invention. The optical receiver 1 outputs signals, DATA+ and DATA−, complementary to each other and corresponding to an optical signal PIN. The optical receiver 1 comprises a converting unit 2 for converting the optical signal PIN into an electrical signal, a processing unit 3 for processing the converted electrical signal, and a monitoring unit 4 for detecting whether the optical signal is shut down or not.

The converting unit 2 includes a photodiode (hereinafter denoted as PD) 21 for generating a photocurrent corresponding to the optical signal PIN, a trans-impedance amplifier (hereinafter denoted as TIA) 22 for converting the photocurrent into a voltage signal, and a buffer amplifier 23 to convert the output of the TIA 22 whose output is the single-ended output into a differential signal. The cathode of the PD 21 is connected to the power supply VCC 18.

The processing unit 3 includes amplifiers, 32 and 33, and a resistor 31 that defines the input impedance of the processing unit 3. Specifically, two inputs of the first amplifier 32 are connected not only to each output of the buffer amplifier 23 via coupling capacitor, 13a or 13b, but also connected to each other via the resistor 31. Thus, two capacitors, 13a and 13b, the output impedance of the buffer amplifier 23, and the resistor 31 constitute the HPF. Two amplifiers, 32 and 33, are configured to be a differential amplifier to stably operate in high frequencies. The processing unit 3 amplifies and reshapes the output of the converting unit 2 to generate the complementary signals, DATA+ and DATA−, corresponding to the optical signal PIN. One output S+ of the first amplifier 32 is sent to the monitoring unit 4 to be served in the decision of the presence of the optical signal PIN.

The monitoring unit 4 includes two consecutive identical digit (CID) detectors, 6a and 6b, two counters, 7a and 7b, two latches, 8a and 8b, an OR-gate 9, a controller 11, a reference generator 12, and a reset generator 10. These circuit blocks may be independently configured, or may be integrally formed.

The reference generator 12 generates two references, 0_REF and 1_REF, each sent to the first and second CID detectors, 6a and 6b. The first CID detector 6a, which includes a peak hold 61 and a Comparator 62, sets the output 1_COMPARE when the signal S+ sent from the processing unit 3 is smaller in the peak envelope thereof than the reference 1_REF. Specifically, the peak Hold 61 traces the peak level of the signal S+ and the comparator 62 sets the output 1_COMPARE when this trace is smaller than the reference 1_REF. A situation where the signal S+ in the peak trace is smaller than the reference 1_REF may occur when the optical signal PIN is shut down.

The first counter 7a with the maximum count N decides whether the signal S+ is in the true alarm condition or not. That is, even when the output 1_COMPARE of the comparator 62 is set, the status of the signal S+ is regarded in the alarm free when the period, during which the output 1_COMPARE of the comparator 62 is set, is shorter than a preset period. The input CLR of the counter 7a receives the output 1_COMPARE of the comparator 62. When the output 1_COMPARE becomes HIGH, namely, the output 1_HOLD of the peak hold 61 being smaller than the reference 1_REF, the counter 7a forwards the count, and sets the output 1_COUNT thereof when the number of the count reaches N. When the output 1_COMPARE becomes LOW before the count reaches N, the output 1_COUNT of the counter 7a is reset, and restarts the count from the initial when the output 1_COMPARE is set again.

The latch 8a is a set/reset-flip/flop, hereinafter denoted as the SR-F/F, holds the HIGH status of the output 1_COUNT of the counter 7a when the counter 7a forwards the count and the number of count reaches N. The input S of the SR-F/F 8a receives the output 1_COUNT of the counter 7a, while, the output 1_LATCH of the SR-F/F 8a is sent to the OR-gate 9. Setting the input S, the output 1_LATCH of the SR-F/F 8a is set, and holds the status thereof until the input R is set even when the input S is reset.

The second CID detector 6b, which includes a bottom hold 65 and a comparator 66, sets the output 0_COMPARE thereof when the bottom level of the signal S+ becomes greater than the reference 0_REF. Specifically, the bottom hold 65 traces the bottom level of the signal S+ and the comparator 66, comparing this trace 0_HOLD with the reference 0_REF, sets the output 0_COMPARE thereof when the trace 0_HOLD is greater than the reference 0_REF. A situation where the signal S+ in the bottom trace is greater than the reference 0_REF may occur when the optical signal PIN becomes quasi stable with substantial amplitude but without any data.

The second counter 7b, similar to the other counter 7a, has the configuration that the maximum count is N and decides the signal S+ is not in the true alarm status when the period, during which the output 0_COMPARE of the comparator 66 is set, is shorter than the preset period.

The second latch 8b include, similar to the first latch 8a, a SR-F/F and holds the set status of the output 0_COUNT of the counter 7b when the counter 7b forward the count and the number of the count reaches N. The input S of the SR-F/F 8b receives the output 0_COUNT of the counter 7b, while, the output 0_LATCH of the SR-F/F 8b is sent to the OR-gate 9. Setting the input S, the output 0_LATCH of the SR-F/F 8b is set, and holds the status thereof until the input R is set even when the input S is reset.

The OR-gate 9 merges the output 1_LATCH of the first SR-F/F 8a with the output 0_LATCH of the second SR-F/F 8b to generate the alarm LOS_ALARM, that is, carries out the OR operation for two outputs, 1_LATCH and 0_LATCH. This alarm LOS_ALARM is provided to the signal processing unit placed outside of the monitoring unit 4.

The reset generator 10 generates the reset signal CLR to recover the latch state of the SR-F/Fs, 8a and 8b, when the optical input signal PIN recovers from the shut down state. The reset generator 10 detects the recovery of the input signal PIN as follows: (1) the outputs, 1_COUNT and 0_COUNT, of two counters, 7a and 7b, are both reset and the output LOS_ALARM of the OR-gate 9 is set, and (2) such status continues for a preset period. When the conditions above are satisfied, the reset generator 10 sends the reset signal CLR to the latches, 8a and 8b.

More specifically, the reset generator 10 includes an AND gate 15 and a counter 16 with the maximum count M. The AND gate 15 performs a logical product of the inverted outputs, /1_COUNT and /0_COUNT, of the counters, 7a and 7b, and the output of the OR-gate 9, and sends the result to the input CLR of the counter 16. The clock input of the counter 16 receives the system clock CLK which is the same with those sent to the counters, 7a and 7b. When the output of the AND gate is set, then the counter 16 forwards the count by the system clock CLK. When the count reaches M, the counter sets the output CLR thereof, which is sent to the input R of the SR-F/Fs, 8a and 8b. The maximum count M is preferably greater than a count 2×N+2 to prevent the monitoring unit 4 from the erroneous reset.

The controller 11 has functions of; (1) providing the system clock CLK to the counters, 7a, 7b, and 16, (2) providing a control signal HIS to the reference generator 12 to set the references, 1_REF and 0_REF, by which the comparators, 62 and 66, have the hysterisis characteristic, and (3) providing a control signal SEL to the reset generator that selects the period for releasing the latch state. The system clock CLK is independent of the clock contained in the optical signal PIN, and may have a frequency of, for instance, 1 MHz. The control signal SEL may have the maximum count of the counter 16, which is equivalent to the timing to release the latch state of the SR-F/Fs, 8a and 8b, selectable. For example, setting the signal SEL in the HIGH level, the maximum count M is set to 16, while, resetting the signal SEL, the maximum count M is reduced to 8.

Next, time charts of the optical receiver shown in FIG. 1 will be described. First, a case where the optical signal PIN is changed from the normal state to the shut down state. Figures from 2A to 2G show, in the case where the optical signal PIN is shut down at t2, time charts of the optical signal PIN, the outputs, S+ and S−, of the processing unit 3, the output 1_HOLD of the peak hold 61, the output 1_COMPARE of the comparator 62, the system clock CLK, the output 1_COUNT of the counter 7a, and the output 1_LATCH of the RS-F/F 8a, respectively.

Figures 2A, 2B:
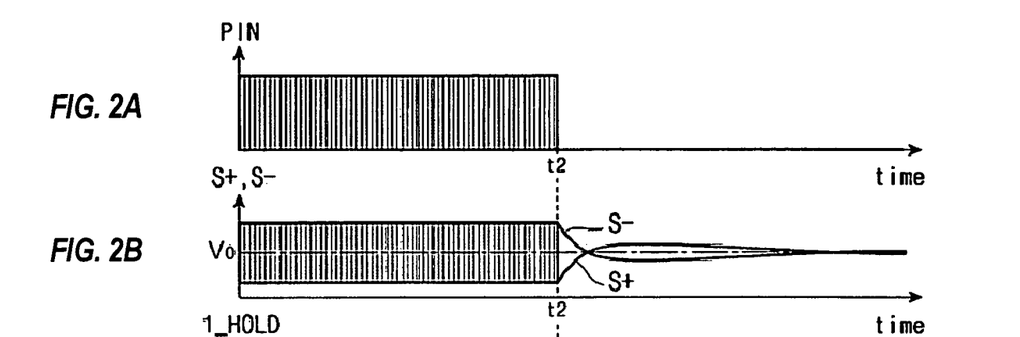

Shutting down the optical signal PIN at t2, the output of the HPF filter in the processing unit 3, as shown in FIG. 2B, converges on the center level $V_0$ accompanying with undershoots and overshoots. The HPF has a time constant $\tau$ determined by the output impedance $Z_{OUT}$ of the buffer amplifier 23, the capacitance C of coupling capacitors, 13a and 13b, and the resistance $R_{IN}$ of the resistor 31;

$$\tau = C \times (R_{IN} + R_{OUT}).$$

The overshoots and undershoots of the signals, S+ and S−, output from the HPF and the period until the output therefrom becomes stable around the center level depends on this time constant.

Figures 2C, 2D, 2E, 2F, 2G:
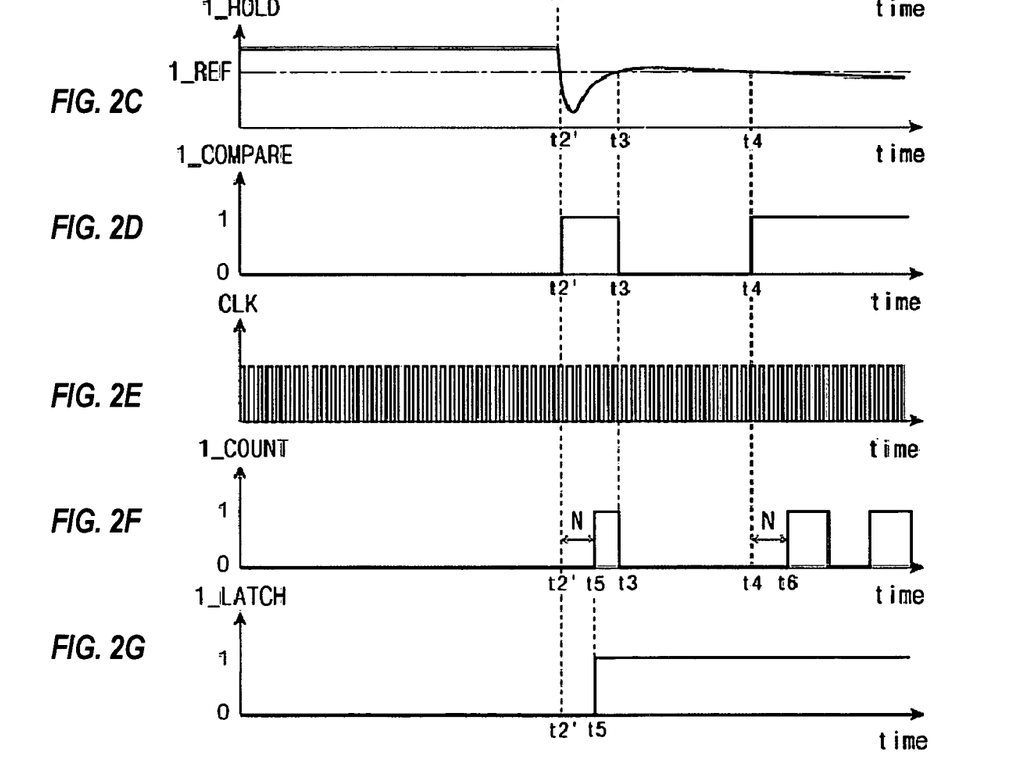

The signal S+ is taken by the 1_CID detector 6a and is traced in its peak level by the peak hold 61, as shown in FIG. 2C. Depending on the reference 1_REF, the trace often exceeds the reference 1_REF, in particular, when the trace contains the under shoot. Accordingly, the output 1_COMPARE of the comparator 62, which compares the output 1_HOLD of peak hold 61 with the reference 1_REF, is set at t' just after t2 at the shutting down of the optical signal PIN, reset at t3, and set at t4 again, as shown in FIG. 2D.

The output 1_COMPARE of the comparator 62 is sent to the input CLR of the counter 7a. The counter forwards the count by the system clock (FIG. 2E) during the input CLR is set, and sets the output thereof when the count reaches the maximum N, as shown in FIG. 2F. For example, when the frequency of the system clock is 1 MHz and the maximum count N is set 4, then the period becomes 4 μsec. That is, an example shown in FIG. 2, the output 1_COUNT of the counter 7a will be set when a state the signal S+ output from the processing unit 3 becomes smaller than the reference 1_REF continues at least 4 μsec.

The counter 7a resets the output 1_COUNT thereof when the output 1_COMPARE of the comparator 62 is reset. In FIG. 2F, since the output 1_COMPARE of the comparator 62 is reset at t3, the output 1_COUNT of the counter 7a is also reset at t3. Moreover, the counter 7a is set at t6 after forwarding the count to reach the maximum N starting at t4 when the output 1_COMPARE of the comparator 62 is set again.

The output of the counter 7a iterates its set and reset state with a period of the count N during the output 1_COMPARE of the comparator 62 keeps the set state thereof. Accordingly, it is necessary to hold the output 1_COUNT of the counter 7a by the latch 8a. In FIG. 2G, the output 1_LATCH of the SR-F/F 8a is set immediately after the output 1_COUNT of the counter 7a is set. This output 1_LATCH of the SR-F/F 8a is sent to the OR-gate 9 and is output from the monitoring unit 4 as the alarm signal LOS_ALARM.

Figures from FIG. 3A to FIG. 3G show time charts of the optical input signal PIN, the outputs, S+ and S−, of the processing unit 3, the output 0_HOLD of the bottom hold 65, the output 0_COMPARE of the comparator 66, the system clock CLK, the output 0_COUNT of the duration filter 7b, and the output 0_LATCH of the latch 8b, respectively.

Figures 3A, 3B, 3C:
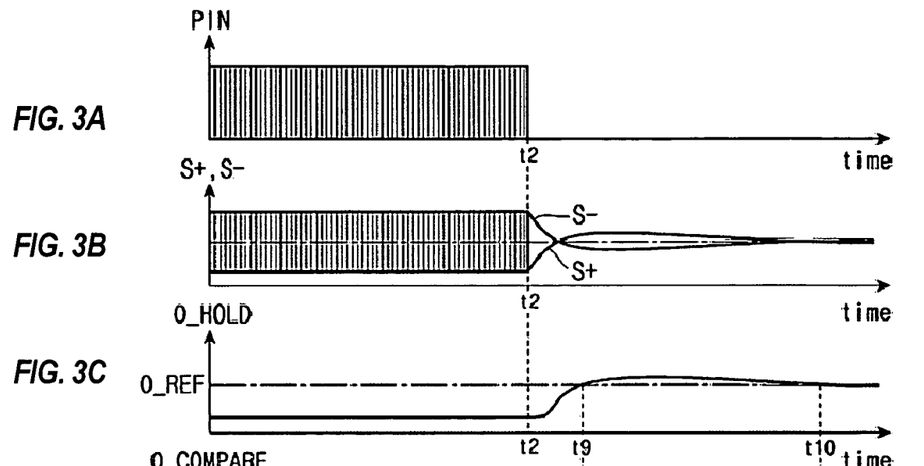

When the optical signal PIN is shut down at t2, the outputs, S+ and S−, of the HPF in the processing unit 3, shown in FIG. 3B, converges on the center level $V_0$ accompanying with undershoots and overshoots. The signal S+ is sent to the bottom detector 6b, in which the bottom hold 65 traces the bottom level of the signal S+, as shown in FIG. 3C. The traced signal 0, which is the output 0_HOLD of the bottom hold 62, often exceeds the reference 0_REF depending on the level of the reference 0_REF. In particular, when the signal S+ associates some overshoots, the event where the traced signal S+ exceeds the reference 0_REF may appear. In FIG. 3C, the traced signal 0_HOLD exceeds the reference 0_REF during from t9 to t10 after the shutting down of the optical signal PIN at t2. Accordingly, the output 0_COMPARE of the comparator 66 is set at t9 and reset at t10, as shown in FIG. 3D.

The times t9 and t10, when the output of the comparator 66 is set or reset, depend on the reference 0_REF. That is, the reference 0_REF becomes smaller, the time t9 when the output 0_COMPARE of the comparator 66 is set brings forward and the time t10 when the output 0_COMPARE of the comparator 66 is reset delays. Accordingly, the reference 0_REF becomes smaller; the period when the output 0_COMPARE of the comparator 66 is set is prolonged. Moreover, the timing to change the state of the comparator 62 also depends on the reference 1_REF. Referring to FIG. 3D, the reference 1_REF becomes larger, the timing t2' to set the comparator 62 is delayed, while, the timing t3 to reset the comparator 62 is brought forward. Accordingly, the reference 1_REF becomes larger; the period where the output 1_COMPARE of the comparator 62 is set is shortened.

The optical receiver 1 according to the present embodiment preferably defines the references, 1_REF and 0_REF, in the following manner. That is, the references, 1_REF and 0_REF, are set such that at least one of the outputs, 1_COMPARE or 0_COMPARE, of the comparators, 62 or 66, is reliably set from the shutting down of the optical signal PIN, exactly speaking, the output 1_COMPARE of the comparator 62 or that 0_COMPARE of the comparator 66 is set, until the optical signal PIN recovers.

Figures 3D, 3E, 3F, 3G:
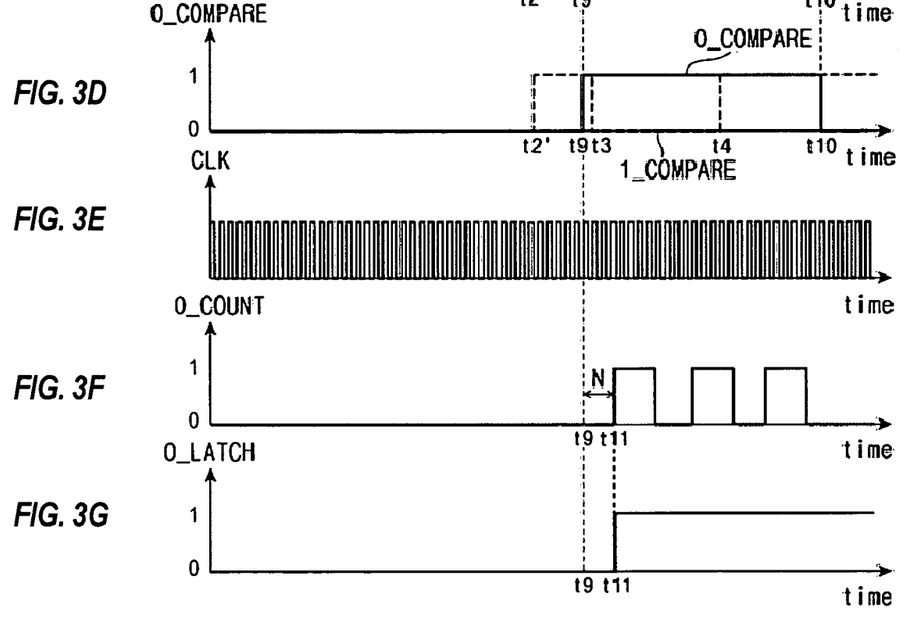

More specifically, the references, 1_REF and 0_REF, are defined such that, in FIG. 3D, the time t9 when the output 0_COMPARE of the comparator 66 is set precedes the time t3 when the output 1_COMPARE of the comparator 62 is reset and the time t4 when the comparator 62 is set again follows the time t10 when the comparator 66 is reset. Thus, by setting the references, 1_REF and 0_REF so as to overlap the portion of the set period of the comparator 66 with the set period of the comparator 62, at least one of the outputs of comparators, 62 or 66, is inevitably set in any instant after the shutting down of the optical signal PIN. Such references, 1_REF and 0_REF, may be set in advance or may be determined by feeding the output of the OR-gate 9 to the reference generator 12. Thus, two outputs of the comparators, 62 and 66, maybe complementary to each other, the alarm LOS_ALARM may be securely prevented from misjudging.

The output 0_COMPARE of the comparator 66 is fed to the input CLR of the counter 7b. This counter 7b, similar to the previous counter 7a, forwards the count by the system clock CLK while the output 0_COMPARE of the comparator 66 is set, and sets the output 0_COUNT thereof when the count reaches the maximum N, as shown in FIG. 3F. When the frequency of the system clock is 1 MHz and the maximum count N is 4, the duration period of the counter 7b becomes 4 μsec. That is, in the embodiment above described, the set period of the output 0_COMPARE of the comparator 66 exceeds 4 μsec, which is equivalent to a case that the output 0_HOLD of the bottom hold 65 exceeds the reference 0_REF for at least 4 μsec, and the output 0_COUNT of the counter 7b is set.

When the output 0_COMPARE of the comparator 66 is reset, the counter 7b is automatically reset. In FIG. 3F, because the comparator 66 is reset at t10, the counter 7b is not set after t10. As described earlier, the counter 7b iterates the set and reset states with the period of the N count while the comparator 66 is set. Accordingly, the output of the counter 7b is required to be latched.

The OR-gate 9 performs the OR operation of the outputs, 1_LATCH and 0_LATCH, of two latches, 8a and 8b. Accordingly, the alarm LOS_ALARM is set at earlier instant of t5 when the latch 8a is set or t11 when the latch 8b is set.

Next, an operation when the optical signal PIN recovers from the shutting down state will be described. FIGS. from 4A to 4G show time charts of the optical signal PIN, the outputs, S+ and S−, of the processing unit 3, the output 1_COMPARE of the comparator 62, the system clock CLK, the output 1_COUNTER of the counter 7a, the reset signal CLR, and the output 1_LATCH of the latch 8a, respectively.

Figure 4A:
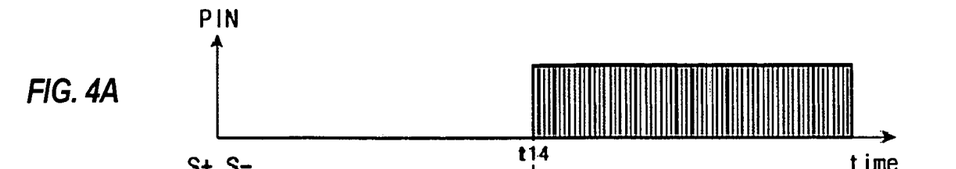
Figure 4B:
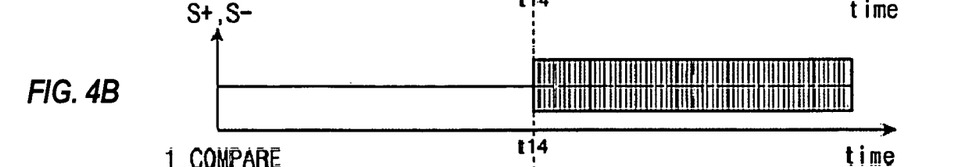
Figure 4C:
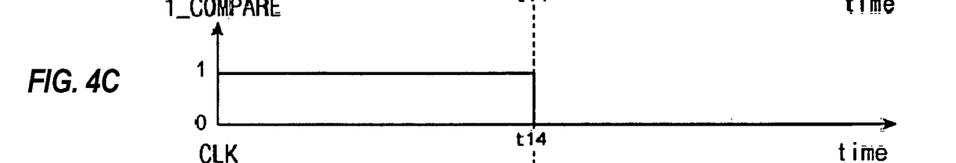
Figure 4D:
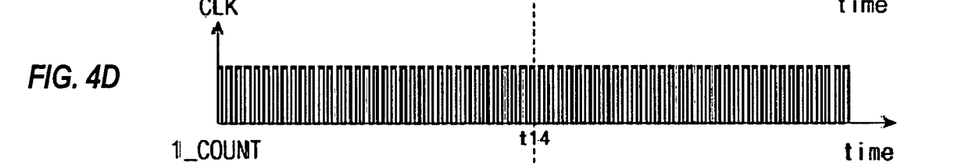

Recovering the optical signal PIN from the shutting down state at t14, the outputs, S+ and S−, of the processing unit 3 recovers at t14, accordingly, the output 1_COMPARE of the comparator 62 exceeds the reference 1_REF, which resets the output of the counter 1_COUNTER, as shown in FIG. 4C.

The counter 7a is reset because the output 1_COMPARE of the comparator 62 is reset to fix the output 1_COUNTER thereof to the LOW level. Although not shown in figures, the output 0_COMPARE of the comparator 66 is also reset at t14. Accordingly, the other counter 7b is also reset to fix the output 0_COUNTER thereof to the LOW level.

Thus, the recovery of the optical signal PIN from the shutting down state fixes the outputs, 1_COUNTER and 0_COUNTER, of the counters, 7a and 7b, to the LOW level. On the other hand, the outputs, 1_LATCH and 0_LATCH, of the latches, 8a and 8b, are kept HIGH, accordingly, the latches, 8a and 8b are necessary to be reset to operate the optical receiver 10. The reset of the latches, 8a and 8b, may be carried out by the signal CLR generated by the reset generator 10.

Figures 4E, 4F, 4G:
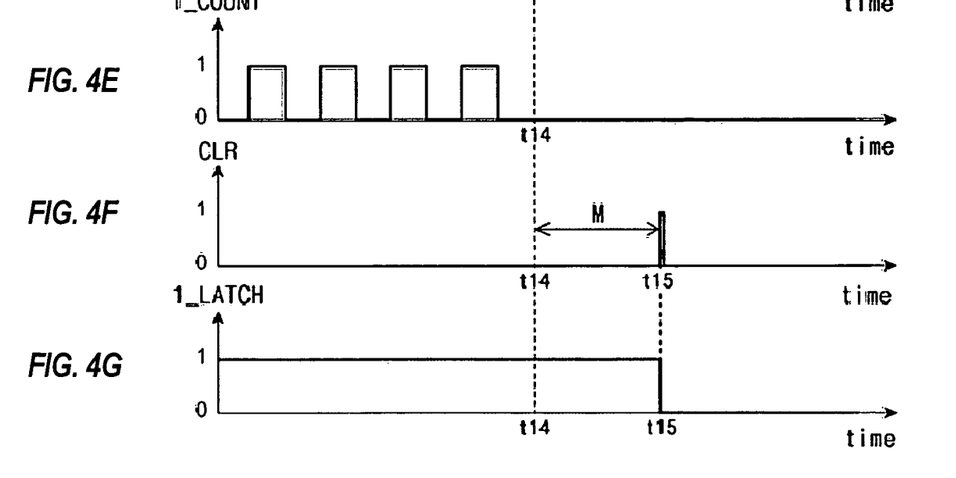

The reset generator 10 sets the signal CLR when two conditions are satisfied:

(1) Both outputs, 1_COUNTER and 0_COUNTER, of counters, 7a and 7b, are reset and the alarm LOS_ALARM is set, and (2) the status described in (1) continues by the period of at least 2×N clocks, preferably, the period of at least 2×N+2 clocks, where N is the maximum count of the counters, 7a and 7b. In the condition (2), the reason why the period of 2×N+2 is preferable is that the counters, 7a and 7b, repeats the HIGH and LOW states with the period of the N clock, as shown in FIG. 4E. That is, it is necessary to assume a case, in order to prevent the misjudging, that the optical signal changes from the LOW consecutive state to the HIGH consecutive state at the same time of the transition of the counter from the LOW level to the HIGH level. Accordingly, two counters, 7a and 7b, are necessary to be watched whether the outputs thereof, 1_COUNT and 0_COUNT, are held in the LOW level for a period of N clocks. Thus, it is preferable for the recovery from the alarm state to set at least the period of N clocks as a stand-by time.

Furthermore, the set timing of the output, 1_COMPARE or 0_COMPARE, of the comparators, 62 or 66, may be delayed by one clock because two comparators, 62 and 66, operate in asynchronous with the system clock CLK. Accordingly, it is more preferable to set additional one cycle in the system clock CLK to the stand-by time. Thus, for the recovery from the alarm state, it is preferable to clear the reset the latches, 8a and 8b, when the condition (1) above described continues at least 2×N+2 system clocks.

Specifically, the AND-gate 15 carries out the logical product of the reverse outputs, /1_COUNT and /0_COUNT, from the counters, 7a and 7b, respectively, and the alarm signal LOS_ALARM. When the condition (1) above described is satisfied, the output of the AND-gate 15 becomes HIGH, which is led to the input CLR of the counter 16 and advances the count. The counter 16 forwards the count while the input CLR, which is the output of the AND-gate 15, is held HIGH. When the count of the counter 16 reaches M (=2×N+2) at t15, where M=16 is exemplified in FIG. 4F, the counter sets the output CLR to be HIGH, which resets two latches, 8a and 8b. In the case that the condition (1) is collapsed during the counting, the counter 16 is initialized and the signal CLR is held LOW.

The reset signal CLR is transmitted to respective inputs R of the RS-F/Fs, 8a and 8b. Thus, these two RS-F/Fs, 8a and 8b are reset as shown in FIG. 4G. Here, by resetting the RS-F/Fs, 8a and 8b, the alarm signal LOS_ALARM is also reset, which means that the condition (1) is collapsed, the counter 16 is reset and the signal CLR is negated immediately after the setting.

The stand-by time from the recovery of the optical signal PIN to the activation of the signal CLR depends on the maximum count of the counter 16 and the timing of the optical signal PIN from the shutting down state to the normal state, which becomes a period of the M+2 clocks at the longest and a period of the M+2−N clocks at the shortest. In the present embodiment, a signal SEL is output from the controller 11 to the counter 16 to change the maximum count M of the counter 16.

The monitoring unit 4 may generate the signal LOS_ALARM when the optical signal PIN becomes a stable state, namely, the optical signal with substantial magnitude but without any data. FIGS. from 5A to 5E show the optical signal PIN changing to the stable state at t2, the outputs of the processing unit 3, S+ and S−, the output 0_HOLD of the bottom hold 65, the output 1_HOLD of the peak hold 61, and the outputs, 1_COMPARE and 0_COMPARE, of the comparators, 65 and 66, respectively.

When the optical signal PIN becomes stable at t2, the output S+ of the processing unit 3 converges on the center level $V_0$ from the higher level, while the output S− converges on the center level $V_0$ from the lower level accompanying with the overshoot and the undershoot. The output S+ is led to the bottom level detector 6b and is traced in the bottom level thereof to produce the signal 0_HOLD. The output 0_HOLD of the bottom hold 65 causes the overshoot, and often becomes greater than the reference 0_REF. In FIG. 6C, the output 0_HOLD exceeds the reference 0_REF from t2' to t17 after the optical signal PIN is switched at t2. Therefore, the output 0_COMPARE of the comparator 66, which corresponds to the comparison of the signal 0_HOLD with the reference 0_REF, is to be set at t2', reset at t17, and set again at t18 after the switch of the optical signal PIN at t2.

Figure 5A:
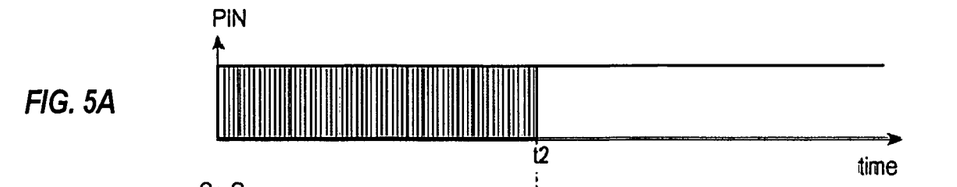
Figure 5B:
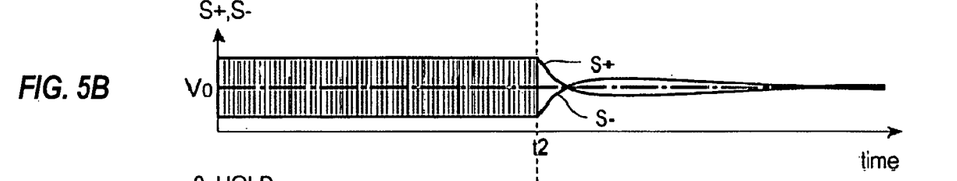
Figure 5C:
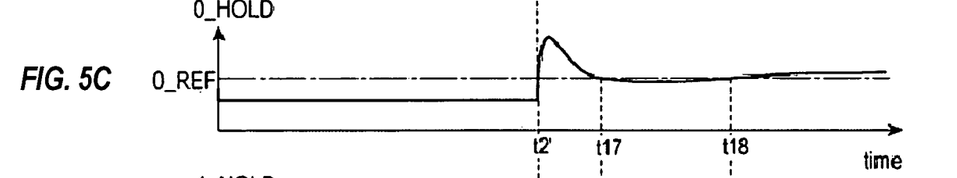
Figure 5D:
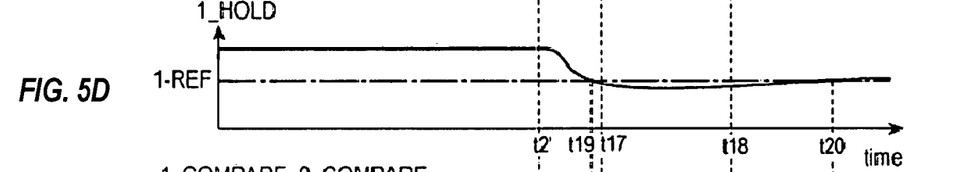
Figure 5E:
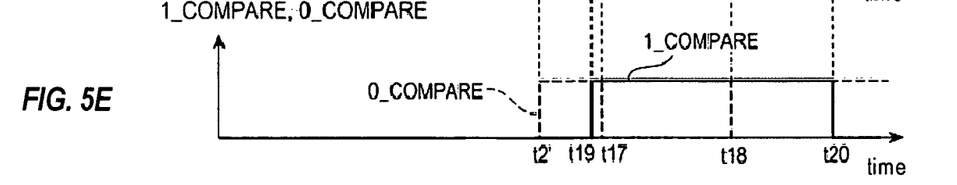

Regarding to the signal S+, this signal is fed to the peak hold 61 and is traced in the peak level thereof. The output 1_HOLD of the peak hold 61 also accompanies with the under shoot, and becomes smaller than the reference 1_REF. In FIG. 5D, the output 1_HOLD of the peak hold 61 is smaller than the reference 1_REF from t19 to t20 after the switching of the optical signal PIN at t2. Accordingly, the output 1_COMPARE of the comparator 62 is set at t19 and reset at t20.

As described previously, the references, 1_REF and 0_REF are preferable to be determined such that at least one of the outputs, 1_COMPARE or 0_COMPARE, is set in any instance after the optical signal PIN becomes stable, exactly speaking, after the setting of one of the outputs, 1_COMPARE or 0_COMPARE, of the comparator, 62 or 66. Specifically, in FIG. 5E, the references, 1_REF and 0_REF, are determined such that the setting of the output 1_COMPARE of the comparator 62 at t19 advances the resetting of the output 0_COMPARE of the comparator 66 at t17 and the resetting of the output 1_COMPARE at t20 delays the setting of the output 0_COMPARE at t18. Thus, the outputs of the comparators, 62 and 66, may compensate for each other and may prevent the alarm signal LOS_ALARM from misjudging.

The processes subsequent to the comparators, 62 and 66, when the optical signal PIN becomes stable are same as those shown in FIGS. 2E to 2G and FIGS. 3E to 3G. Further, the processes when the optical signal PIN recovers from the stable state, that is, recovers to the switching state containing data component, are same as those shown in FIGS. 4B to 4G.

The peak hold 61 and the bottom hold 65 trace the peak and bottom levels of the signal S+ by holding the signal in a holding capacitor. To increase the capacitance of this capacitor may compress the ripple derived from the signal S+ but degrades the transient response thereof. On the other hand, to use the capacitor with relatively small capacitance may improve the response but increase the ripple resulting from the signal S+. Therefore, when the reference 1_REF is set relatively high, the output 1_COMPARE of the comparator 62 may be switched by the ripple. The monitoring unit 4 according to the present invention provides the counter 7a that prevents the monitoring unit 4 from outputting the alarm signal LOS_ALARM even when the comparator 62 switches the output 1_COMPARE thereof by responding the ripple. Similarly, the other counter 7b may prevent the monitoring unit 4 from setting the alarm LOS_ALARM even when the comparator 66 is switched by responding the ripple.

The monitoring unit 4 receives the signal S+ from the processing unit 3 not the converting unit 2, nor directly from the PD 21, which prevents the PD 21 from degrading the high frequency response.

Moreover, the monitoring unit 4 provides counters, 7a and 7b, for each output of the comparators, 62 and 66, to filter the duration time of the outputs, 1_COMPARE and 0_COMPARE. Therefore, even when the comparators, 62 and 66, switches the output thereof by responding the ripple, the monitoring unit 4 does not regard the state as the optical signal being shut down. Accordingly, two holds, 61 and 65, may decrease the capacitance of the capacitor for holding the signal, which may accelerate the timing to set the alarm LOS_ALARM when the optical signal PIN becomes shut down.

Second Embodiment

Figure 8:
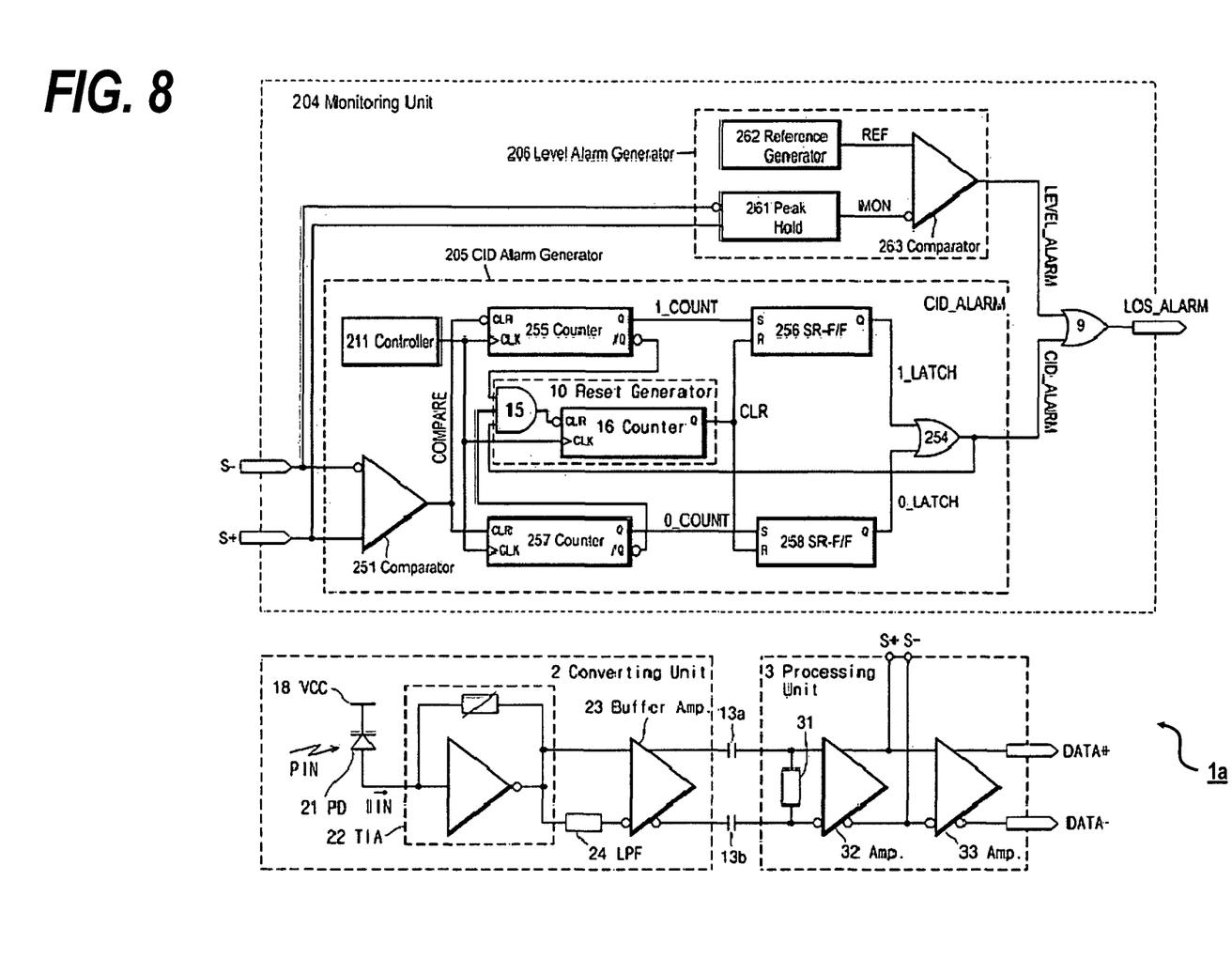
FIG. 8 is a block diagram of the optical receiver according to the second embodiment of the present invention; and FIGS. from 9A to 9F show time charts of the optical signal PIN, the outputs, S+ and S−, of the processing unit, the output CID_ALARM of the CID alarm generator, the output LEVEL_ALARM of the level alarm generator, and the output LOS_ALARM of the monitoring unit.

FIG. 8 shows an optical receiver according to the second embodiment of the invention. The optical receiver 1a in FIG. 8 has the converting unit 2, the processing unit 3, and the monitoring unit 4a. The former two units, 2 and 3, have the same configuration with those described in the first embodiment.

The monitoring unit 4a of the second embodiment includes the CID alarm generator 205, the level alarm generator 206, the controller 211, and the OR-gate 9. These blocks may be constructed independently or may be formed integrally on single chip. The controller 211 provides the system clock CLK to the CID alarm generator 205.

The level alarm generator 206 generates an alarm LEVEL_ALARM, when the difference between signals, S+ and S−, is smaller than the reference REF, and includes a peak hold 261, a reference generator 262 and the comparator 263. The peak hold 261 detects a difference of signals, S+ and S−, and traces this difference. The reference generator 262 generates the reference REF and the comparator 263 sets the output thereof when the difference is smaller than the reference REF, while resets the output thereof when the difference is greater than the reference REF. The comparator 263 may preferably provide a hysterisis characteristic.

The CID alarm generator 205 has the same configuration with those of the monitoring unit 4 in the first embodiment except that the input thereof receives the signals, S+ and S−, complementary to each other. That is, the CID alarm generator 205 includes a comparator 251, first and second counters, 255 and 257, first and second latches, 256 and 258, and an OR-gate 254. The comparator 251 decides the level of the inputs, S+ and S−, that is, when the signal S+ is greater than the other, the level is regarded as HIGH, while the signal S+ is smaller than the other, the level is LOW. The counters, 255 and 257, count the duration period of respective levels by the system clock based on the output COMPARE of the comparator 251. That is, the counter 255 sets the output 0_COUNT thereof when the output COMPARE continues the LOW level for the preset time. Similarly, the counter 257 sets the output 1_COUNT thereof when the output COMPARE of the comparator continues the HIGH level for the preset time. Two latches, 256 and 258, latch the respective outputs, 0_COUNT and 1_COUNT, of the counter 255 and 257, and do not reverse the output thereof, 0_LATCH and 1_LATCH, even when the output of the counters, 0_COUNT and 1_COUNT, are reset. The OR-gate 254 merges the outputs of the latches, 0_LATCH and 1_LATCH, to create the alarm signal CID_ALARM.

The OR-gate 9 generates the signal LOS_ALARM by performing the logical sum of the output CID_ALARM of the CID alarm generator 205 with the output LEVEL_ALARM of the level alarm generator 206.

FIGS. from 9A to 9F show the time charts of the monitoring unit 204 when the optical signal PIN is shut down at t1 and is recovered at t2. The time t9 when the level alarm generator 206 outputs the signal LEVEL_ALARM delays from the time t1 due to the presence of the HPF including capacitors, 13a and 13b. For instance, setting the time constant τ of the HPF is 46 μsec, the time t9 delays by about 105 μsec from the time t1. Where, the condition τ=46 μsec is derived from the capacitance of about 44 nF to set the cut-off frequency fc=3.455 kHz of the HPF to satisfies the OC-3/STM-1 standard under the condition for the resistors, $Z_{OUT}$=50Ω and $R_{IN}$=1 kΩ.

For the CID alarm generator 205, the maximum count of the counters, 255 and 257, decides the time to set the alarm CID_ALARM after the optical signal PIN is shut down. For example, when the system clock is 1 MHZ and the maximum count N is set 4, then the time t10 when the alarm CID_ALARM is set delays by about 4 μsec from the time t1. Thus, the time for setting the alarm LOS_ALARM, which is the logical sum of the alarms, LEVEL_ALARM and CID_ALARM, accordingly, becomes substantially equal to the time for setting the alarm CID_ALARM. As shown in FIG. 9F, the present monitoring unit may shorten the set-up time for the alarm LOS_ALARM compared with the conventional configuration where the monitoring unit 204 only includes the level alarm generator.

Figure 9A:
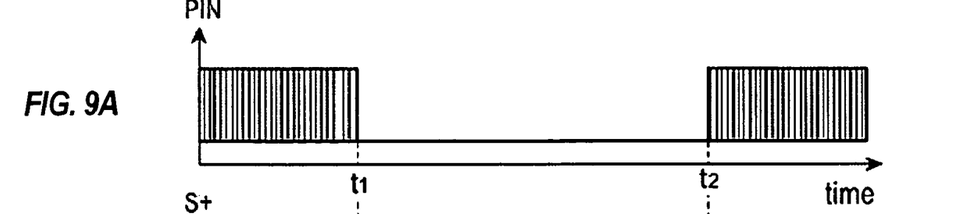
Figure 9B:
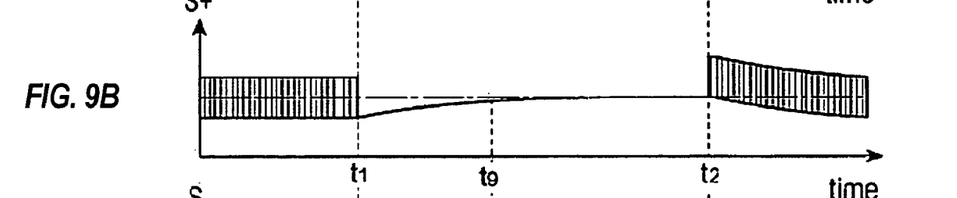
Figure 9C:
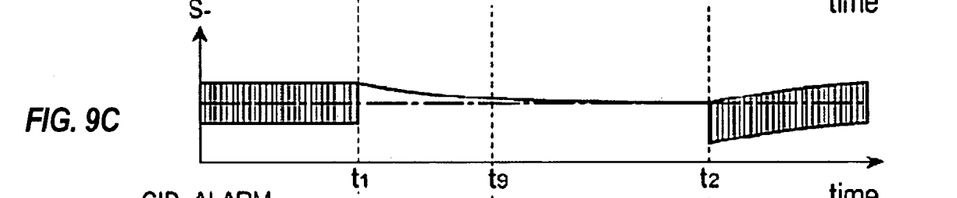
Figure 9D:
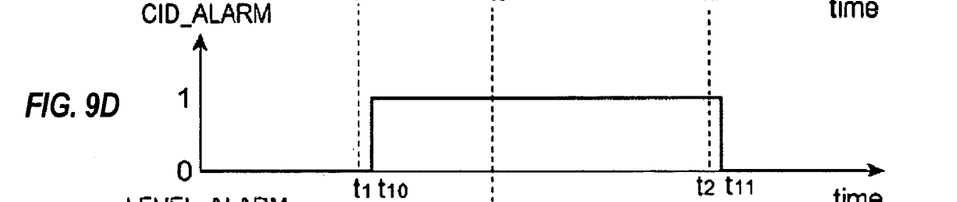
Figure 9E:
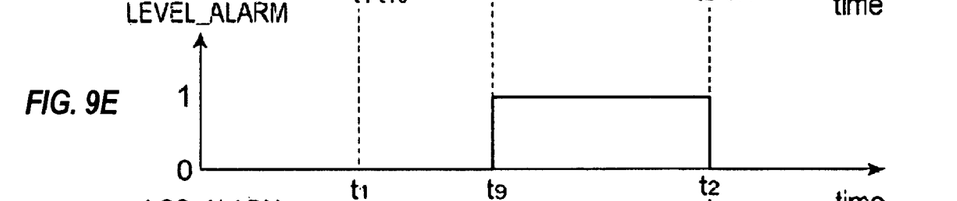
Figure 9F:
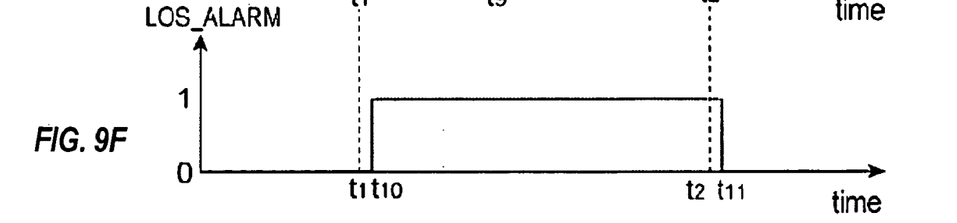

Moreover, when the optical signal PIN recovers at t2, the reset of the level alarm generator 206, LEVEL_ALARM, precedes the reset of the CID alarm generator 205, CID_ALARM, because the signals, S+ and S−, may quickly follow the recovery of the optical signal PIN, typically as quick as about a few μsec delaying from the recovery, as shown in FIGS. 9B and 9C. On the other hand, the CID alarm generator 205 requires a time corresponding to the maximum count of the counters, 255 and 257, preferably at leas 2×N+2 count. Accordingly, the time for resetting the alarm LOS_ALARM depends of the time for resetting the alarm CID_ALARM.

However, when the counter 16 in the reset generator 10 is set by 16 for the maximum count M and the system clock is 1 MHz, the reset generator 10 may set the signal CLR delayed by 16 μsec after the condition (1) for releasing the alarm is satisfied. Therefore, the CID alarm generator 205 may be reset within a relatively short time, for example 7 μsec in the present embodiment, after the conditions (1) is satisfied. This performance to reset the alarm, LOS_ALARM, with such quick delay can follow the standard of the multi-source agreement (MSA) for the pluggable data link with a quite enough margin.

The optical receiver according to the present invention is not restricted to those exemplarily shown above. For example, the monitoring unit shown in FIG. 1 or FIG. 8 applies the SR-F/F for the latch, 8a or 8b. However, a combination of the OR-gate and the D-type flip-flop (D-F/F) may be applicable for the latch. By providing the system clock to the D-F/F, the outputs, 1_LATCH and 0_LATCH, of the latches, 8a and 8b, can be synchronized with the system clock. Similarly, by installing an additional D-F/F posterior to the OR-gate 9 and providing the system clock to this D-F/F, the alarm LOS_ALARM, cane be synchronized with the system clock.

Furthermore, the embodiment described above, the references, VREF, 1_REF and 0_REF, are directly provided to respective comparators, 62, 66 and 264. However, these references may be provided via the hold circuit similarly to the signals, S+ and S−. In those configurations, the accuracy of the comparison may be enhanced because two signals input to the comparator and to be compared thereat may become signals transmitted through the circuit equivalent to each other.

While the invention has been described with reference to particular example embodiments, further modifications and improvements which will occur to those skilled in the art, may be made within the purview of the appended claims, without departing from the scope of the invention in its broader aspect.

What is claimed is:

1. A method for detecting a consecutive identical state in a HIGH level or in a LOW level of an optical signal transitional between the HIGH level and the LOW level, and for generating an alarm signal when the consecutive identical state continues by a predetermined period, the method comprising steps of:
   (a) converting the optical signal into a corresponding electrical signal;
   (b) setting a first comparative output when the electrical signal detected through a coupling capacitor is in a first state corresponding to the HIGH level of the optical signal, and setting a second comparative output when the electrical signal detected through the coupling capacitor is in a second state corresponding to the LOW level of the optical signal, wherein the electrical signal detected through the coupling capacitor includes a second order lag;
   (c) counting a first period by a first counter when the first comparative output is set and a second period by a second counter when the second comparative output is set;
   (d) latching an output of the first counter by a first latch when the first counter counts at least a predetermined number and latching an output of the second counter by a second latch when the second counter counts at least a predetermined number; and
   (e) performing a logical sum of the output of the first latch and the output of the second latch to generate the alarm signal.

2. The method according to claim 1,
   wherein the setting of the first comparative output is performed by comparing the electrical signal detected through the coupling capacitor with a first reference and the setting of the second comparative output is performed by comparing the electrical signal with a second reference.

3. The method according to claim 1,
   wherein the electrical signal detected through the coupling capacitor includes a differential signal with a normal phase signal and an opposite phase signal, the setting of the first comparative output and the setting of the second comparative output being carried out by comparing the normal phase signal with the opposite phase signal.

4. The method according to claim 1,
   wherein the output of the first counter is reset when the first comparative output is reset and the output of the second counter is reset when the second comparative output is reset.

5. An optical receiver for receiving an optical signal to generate an output electrical signal corresponding to the optical signal, comprising:
   a converting unit configured to receive the optical signal and to generate an electrical signal corresponding to the optical signal;
   a processing unit for amplifying the electrical signal, the processing unit being coupled with the converting unit through a coupling capacitor; and
   a monitoring unit configured to detect a state where the optical signal is shut down or is kept constant, and to generate an alarm signal when a peak level of the electrical signal becomes smaller than a first reference for a predetermined period or when a bottom level of the electrical signal becomes greater than a second reference for the predetermined period,
   wherein the monitoring unit receives the electrical signal with a second order lag through the coupling capacitor; and
   wherein the monitoring unit includes first and second counters, and a controller; the first counter removing a state that a period when the peak level is smaller than the first reference is shorter than the predetermined period by counting a clock provided from the controller and the second counter removing a state that a period when the bottom level is greater than the second reference is shorter than the predetermined period by counting the clock provided from the controller.

6. The optical receiver according to claim 5,
   wherein the monitoring unit further includes first and second latches, the first latch holding an output of the first counter and the second latch holding an output of the second counter.

7. The optical receiver according to claim 6,
   wherein the monitoring unit further includes a reset generator for generating a reset signal to reset the output of the first and second latches when a state where each output of the first and second counters is reset and the alarm signal is set continues a second predetermined period.

8. The optical receiver according to claim 7,
   wherein the reset generator includes a third counter, and
   wherein the second predetermined period is counted by forwarding the third counter by the clock provided from the controller.

9. The optical receiver according to claim 5,
   wherein the first and second references are set such that, in any instant from a transition to a shutting down state or to a constant level state, at least one of conditions that the first reference exceeds the peak level or the second reference is below the bottom level is satisfied.

10. The optical receiver according to claim 5,
    wherein the converting unit outputs, as the electrical signal, a differential signal with a normal phase signal and an opposite phase signal each corresponding to the optical signal,
    wherein the processing unit amplifiers the differential signal to output from the optical receiver, and
    wherein the monitoring unit receives one of the normal phase signal and the opposite phase signal through the coupling capacitor.

11. An optical receiver for receiving an optical signal and for generating an electrical signal corresponding to the optical signal, comprising:
 a converting unit configured to receive the optical signal and to generate an electrical signal corresponding to the optical signal;
 a processing unit for amplifying the electrical signal, the processing unit receiving the electrical signal through a coupling capacitor; and
 a monitoring unit configured to detect a state where the optical signal is shut down or is kept constant, and to generate a first alarm signal when a HIGH level of the electrical signal continues for a predetermined period or when a LOW level of the electrical signal continues for the predetermined period,
 wherein the monitoring unit receives the electrical signal with a second order lag through the coupling capacitor; and
 wherein the monitoring unit includes first and second counters, and a controller, the first counter removing a state that a period, where the HIGH level continues, is shorter than the predetermined period by counting a clock provided from the controller, the second counter removing a state that a period, where the LOW level continues, is shorter than the predetermined period by counting the clock provided from the controller.

12. The optical receiver according to claim 11, wherein the monitoring unit further includes first and second latches, the first latch holding an output of the first counter and the second latch holding an output of the second counter.

13. The optical receiver according to claim 12,
 wherein the monitoring unit further includes a reset generator for generating a reset signal to reset the output of the first and second latches in a case that a state, where each output of the first and second counters is reset while the alarm signal is set, continues a second predetermined period.

14. The optical receiver according to claim 13,
 wherein the reset generator includes a third counter, and
 wherein the second predetermined period is counted by forwarding the third counter with the clock provided from the controller.

15. The optical receiver according to claim 11,
 wherein the electrical signal includes a differential signal with a normal phase signal and an opposite phase signal, and
 the monitoring unit further includes a level alarm generator configured to receive the electrical signal through the coupling capacitor and to generate a second alarm signal when a difference between the normal phase signal and the opposite phase signal is smaller than a reference.

* * * * *